(12) United States Patent
Ha (10) Patent No.: US 7,830,573 B2
(45) Date of Patent: Nov. 9, 2010

(54) METHOD AND SYSTEM FOR PRODUCING MULTIPLE IMAGES IN A SINGLE IMAGE PLANE USING DIFFRACTION

(75) Inventor: Bruce Ha, Brockport, NY (US)

(73) Assignee: Stamper Technologies, Inc., Rochester, NY (US)

( * ) Notice: Subject to any disclaimer, the term of this patent is extended or adjusted under 35 U.S.C. 154(b) by 501 days.

(21) Appl. No.: 11/556,012

(22) Filed: Nov. 2, 2006

(65) Prior Publication Data

US 2007/0097472 A1    May 3, 2007

Related U.S. Application Data

(60) Provisional application No. 60/597,007, filed on Nov. 3, 2005.

(51) Int. Cl.
*G03H 1/04* (2006.01)
*G03H 1/26* (2006.01)
*G02B 5/32* (2006.01)
*G02B 5/18* (2006.01)

(52) U.S. Cl. .............. 359/35; 359/15; 359/22; 359/566; 359/9; 359/900

(58) Field of Classification Search .......... 359/25
See application file for complete search history.

(56) References Cited

U.S. PATENT DOCUMENTS

| | | | | |
|---|---|---|---|---|
| 4,568,141 A * | 2/1986 | Antes | ............... | 359/2 |
| 4,967,206 A | 10/1990 | Akutsu et al. | | |
| 4,967,286 A | 10/1990 | Nomula et al. | | |
| 5,016,953 A * | 5/1991 | Moss et al. | .............. | 359/9 |
| 5,138,604 A | 8/1992 | Umeda et al. | | |
| 5,452,282 A | 9/1995 | Abraham | | |
| 5,533,002 A | 7/1996 | Abraham | | |
| 5,568,313 A | 10/1996 | Steenblik et al. | | |
| 5,751,690 A | 5/1998 | Ohira et al. | | |
| 5,978,112 A * | 11/1999 | Psaltis et al. | .............. | 359/22 |
| 6,011,767 A | 1/2000 | Abraham | | |
| 6,127,066 A * | 10/2000 | Ueda et al. | .............. | 430/1 |
| 6,369,919 B1 | 4/2002 | Drinkwater et al. | | |
| 6,806,982 B2 * | 10/2004 | Newswanger et al. | ........ | 359/35 |
| 2002/0044313 A1* | 4/2002 | Menz et al. | .............. | 359/22 |
| 2004/0008390 A1* | 1/2004 | Hsiao | .............. | 359/2 |
| 2004/0121241 A1* | 6/2004 | Kodama | .............. | 430/1 |
| 2005/0232125 A1 | 10/2005 | Kuroda et al. | | |
| 2007/0081439 A1 | 4/2007 | Tsukagoshi et al. | | |

FOREIGN PATENT DOCUMENTS

EP          1507177       2/2005
WO     2005/043256       9/2004

OTHER PUBLICATIONS

ISR/WO dated Apr. 2, 2008 for International Patent Application No. PCT/US2006/060529.
Office Action in CN Application No. 2006-80048887.5 dated Apr. 13, 2010.
EPO Examination Report for 06846224.1 dated Feb. 9, 2010.

* cited by examiner

*Primary Examiner*—Stephone B Allen
*Assistant Examiner*—Jade R Chwasz
(74) *Attorney, Agent, or Firm*—Snell & Wilmer L.L.P.

(57) ABSTRACT

Methods create images viewable under different selected angles on optical storage devices and other photosensitive surfaces and optical storage devices with super-imposed images. Generally, a photosensitive surface is exposed with multiple diffraction patterns creating super-imposed images. These diffraction patterns create super-imposed images on the photosensitive surfaces, which can be read by either a human or a computer.

32 Claims, 9 Drawing Sheets

METHOD AND SYSTEM FOR PRODUCING MULTIPLE IMAGES IN A SINGLE IMAGE PLANE USING DIFFRACTION

CROSS-REFERENCE TO RELATED APPLICATIONS

This application claims priority to, and the benefit of, U.S. Provisional Application No. 60/597,007, filed Nov. 3, 2005, the disclosure and contents of which are hereby incorporated by reference.

FIELD OF INVENTION

The present invention is generally related to optical storage devices with super-imposed, pseudo-holographic images, and more particularly, to methods for creating pseudo-holographic images on optical storage devices and other photosensitive substrates, wherein the images are viewable under different selected angles.

BACKGROUND OF THE INVENTION

Creating multiple and discriminate images on the same plane is currently achieved by lenticular or holographic techniques. Lenticular techniques rely on the images being separated by a secondary sheet of lenses to discriminate the images. The images are interleaved together and a lenticular sheet composed of a series of cylindrical lenses molded into a plastic substrate is layered on top of the interlaced image.

Holograms or light interference is another way to discriminate images on the same recording plane. With holograms, the goal is to record the complete wave field of both amplitude and phase. In order to record the complete wave field of both amplitude and phase, a reference beam is created to interfere with the object of exposure and then recorded onto a recording medium several microns thick. However, this thickness can often pose an obstacle in terms of image recording time and versatility. For example, in a dot matrix hologram method described in European patent No. 91306316.0 as cited in U.S. Pat. No. 5,452,282, individual holographic gratings are produced by changing the alignment angle of the interference beam to expose from 255 discrete angles. This process is typically very slow and usually takes 5 to 6 hours to expose a one-inch square area.

Another technique, demonstrated by holography pioneers Emmett N. Leith and Juris Upatnieks, separates images using a reference beam that is recorded at a different angle from the object than the beam. However, like other holographic techniques, this relies on the interference pattern of two wavefronts, which causes difficulties and inaccuracies in terms of alignment and environmental controls.

With respect to optical storage media, U.S. Pat. No. 6,011,767 describes a method for providing holograms, wherein the holograms are created on the same surface as the digital recordings using successive exposures with different lasers to create phase interference. This method requires two light wave exposures that create phase interference diffraction gratings to create holograms or dot matrixed holograms. These phase interference diffraction gratings are uniform. Devices incorporating these uniform gratings are commonly referred to as Optical Variable Devices or OVD's. As such, under an Atomic Force Microscope (AFM), an OVD image has evenly distributed gratings and no discrete components. Additionally, creation of these uniform, phase interference diffraction gratings requires expensive and complex multi-laser hardware. This is very different from machines that create digital recordable, re-playable indentations that only use a single beam.

SUMMARY OF THE INVENTION

The present invention includes systems and methods for creating pseudo-holographic images viewable under different selected angles, on optical storage devices and other photosensitive substrates. The present invention also includes novel optical storage devices with super-imposed, pseudo-holographic images. In general, a photosensitive substrate is exposed with multiple diffraction patterns creating superimposed, pseudo-holographic images. These diffraction patterns create super-imposed images on the photosensitive substrate, which can be read by either a human or a computer. The present invention may be applicable to one or more commercially available photosensitive substrates.

The present invention includes a system and method for using a single laser beam wave front and diffractive elements to cause multiple diffractions. In one embodiment, the first order of the multiple diffractions is the most predominant, and the diffractions are created at distinct angles away from the $0^{th}$ order of the wave front as a function of wavelength, the dimensions of the diffraction element, and the index in which the wave front of the light propagates through the diffraction element. That is, the location of each diffraction image is dictated by the equation $n\lambda = d \sin \theta$, where n is the order number, lambda is the wavelength, d is the distance between the diffraction elements and theta is the angle placement of the $n^{th}$ order. Due to these multiple diffractions, the first image of the multiple diffraction images, when viewed either by transmitted and/or reflected light at distinct angles, can be configured to reveal an image designed to have the predominant first order intensity placed at one or more distinct angles. That is, the invention can be used to create a spiral exposure pattern that matches the pixels of the multiple images. The multiple images can also be configured to be recorded at various depths within the recording photosensitive substrate.

More particularly, in one embodiment, the invention includes a system and method for forming pseudo-holographic images comprising: exposing a photosensitive substance to form a plurality of diffractive elements; and, forming a pseudo-holographic, diffraction image comprising said diffractive elements, which can be viewed at an angle.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements, and wherein:

DETAILED DESCRIPTION

Figure 1:
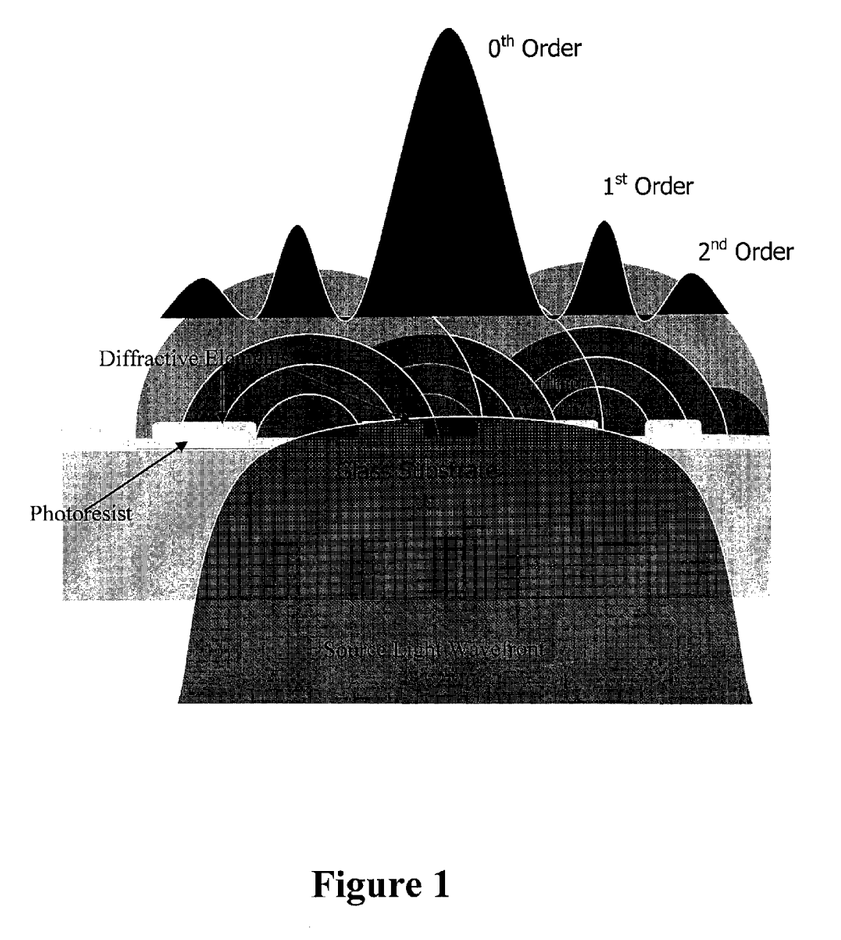
FIG. 1 illustrates light wave propagation off of diffractive elements in accordance with one embodiment of the present invention.

The present invention discloses methods for creating multiple diffraction images on photosensitive substrates. These multiple diffraction images comprise a plurality of diffractive elements, which can be viewed either by transmitted and/or reflected light at distinct angles. As illustrated in FIG. 1, these diffraction elements may be configured to reveal an image designed to have the predominant first order intensity. In turn, the invention can be used to create a spiral exposure pattern that matches the pixels of the multiple images. The multiple images can also be configured to be recorded at various depths and at various gratings within the photosensitive substrate.

Figure 2:
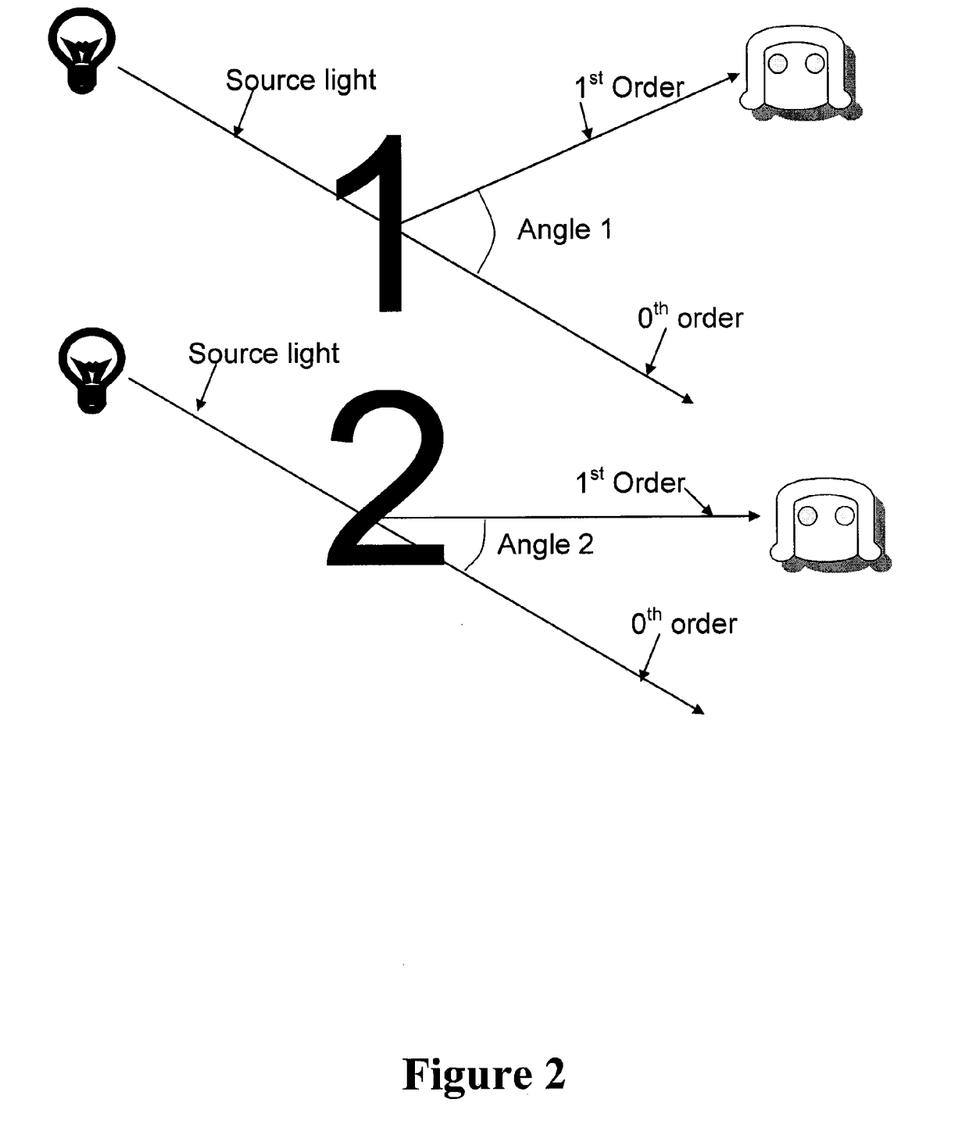
FIG. 2 illustrates light wave propagation off of a second set of diffractive elements, in accordance with one embodiment of the present invention.

In an exemplary embodiment, a first image is used with integer spacing between each successive diffraction element to create a first set of diffraction elements with a first order intensity corresponding to a first angle as illustrated in FIG. 1. Secondly, as illustrated in FIG. 2, a second image is used with non-integer spacing between each successive diffraction element to create a second set of diffraction elements with a first order intensity corresponding to a second angle. For example, the second set of elements has a diffraction grating that is 1.5 microns apart. These differential gratings allow for multiple images to be superimposed on the photosensitive substrate.

In an exemplary embodiment, the photosensitive substrate comprises an optical storage device such as, for example, one or more of: compact discs (CDs), "digital versatile discs" or "digital video discs" (DVDs), BluRay discs (BDs), "high definition DVDs" (HDDVD), Recordable Optical Discs, Pre-Recorded Optical Discs and optical memory cards. Each of these photosensitive substrates includes a photosensitive substance. A photosensitive substance is any substance which reacts upon receiving photons of light. For example, photosensitive substrates like writable CD/DVDs and rewritable CD/DVDs incorporate photodyes or phase-change alloys, respectively. Non-writeable CD/DVDs are produced from master stampers, which are copied into plastic discs and sold. These stampers are produced by coating a photosensitive substance, commonly referred to as a photoresist, or depositing a thin metallic phase changeable material to a substrate and exposing with a laser. One of ordinary skill in the art will recognize that there numerous photoresists and substrates contemplated in this disclosure.

Figure 3:
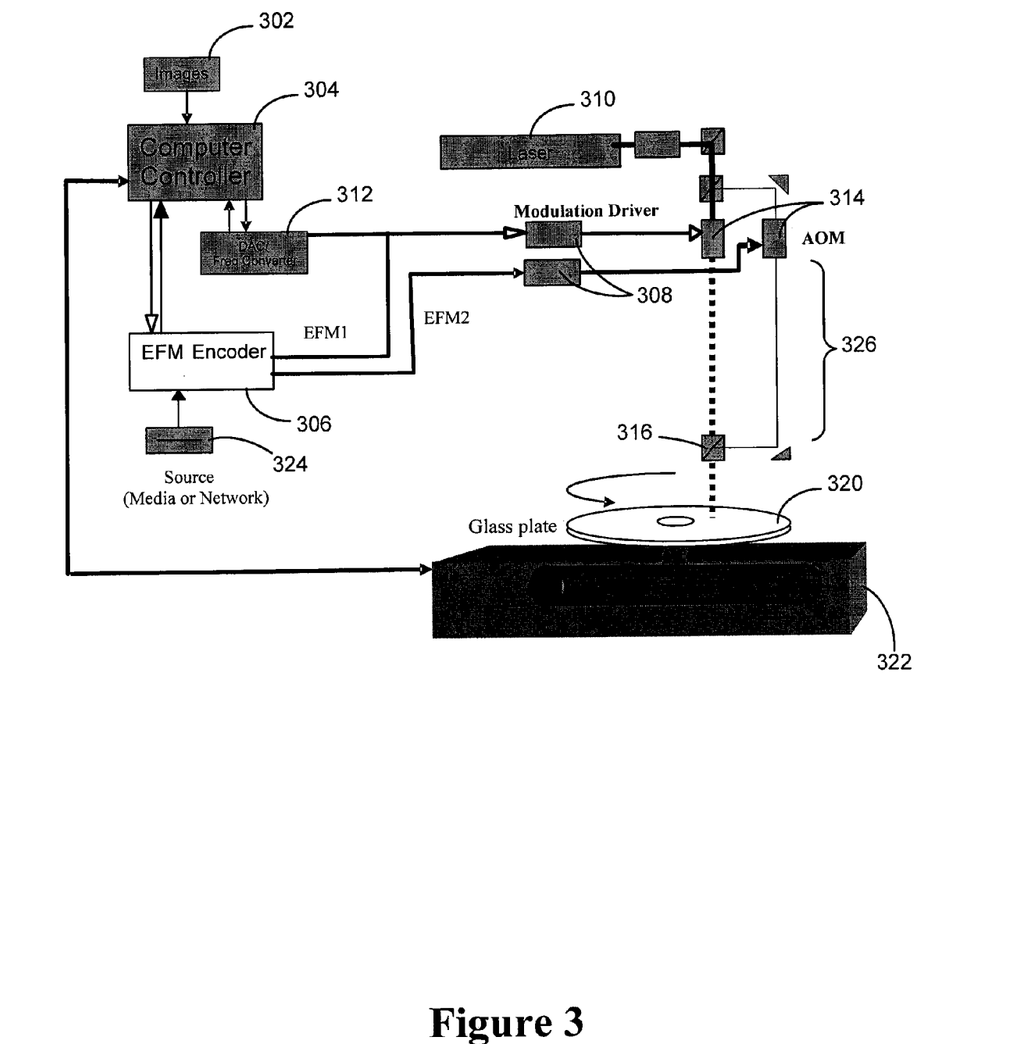
FIG. 3 illustrates an exemplary system for recording multiple pseudo-holographic images viewable under different selected angles, in accordance with exemplary embodiments of the present invention.

A method for recording multiple images is described in more detail with reference to an exemplary system illustrated in FIG. 3. In one embodiment, recording system 300 includes two or more images 302, a computer controller 304, an eight-to-fourteen modulation (EFM) encoder 306, a modulation driver 308, a light source 310, a digital to analog converter (DAC)/frequency controller 312, an acousto-optic modulator (AOM) 314, a lens 316, a photosensitive substrate 320, a turn-table apparatus 322, and a translation system 326. System 300 may also include one or more media sources 324.

That is, recording system 300 is configured with turn-table apparatus 322 to facilitate carrying and rotating photosensitive substrate 320 in synchronization with translation system 326. Recording system 300 can be configured, via a spiral system, to create a recording of digital images 302 onto photosensitive substrate 320 that will have spacing between successive turns equal to each predetermined diffractive grating that is configured with each image 302.

Images 302 can be configured to be any size or shape. In one exemplary embodiment, images 302 are configured to have substantially similar dimensions. Images 302 can also be configured in digital format as one or more of: binary, grayscale, and/or color images. For images 302 configured as binary images, images 302 can be configured with multiple bits to represent different levels of pixel color and intensity. Images 302 can also be configured to have various resolutions, such as 2048×256 pixels, 800×600 pixels, 1024×512 pixels, and/or the like. In one embodiment, images 302 have resolutions of 2048×256 pixels. Further, images 302 can be any type of image files, such as bitmaps, jpegs, gifs, and/or the like.

In one embodiment, computer controller 304 is coupled to EFM encoder 306, modulation driver 308, light source 310, DAC/frequency controller 312, AOM 314, and/or turn-table apparatus 322 to facilitate recording of images 302 onto photosensitive substrate 320. Computer controller 304 comprises a processor, a display, and/or one or more input devices. The processor comprises a personal computer, a UNIX system, or any other conventional processing unit. The display comprises a monitor, LCD screen, or any other device configured to display an image. An input/output device comprises a keyboard, a mouse, a touch-screen, or any other device for inputting information. The information from the input device and images displayed may be received or transmitted in any format, such as manually, by analog device, by digital device, and/or by any other mechanisms. The processor, display, and/or input device may be coupled together in any manner. By coupling, the devices comprising computer controller 304 may directly communicate with each other or may be connected through one or more other devices or components that allow a signal to travel to/from one component to another. The various coupling components for the devices comprising computer controller 304 may include one or more of the internet, a wireless network, a conventional wire cable, an optical cable or connection through any other medium that conducts signals, and any other coupling device or communication medium.

EFM encoder 306 facilitates encoding data from images 302. That is, EFM encoder 306 facilitates converting images 302 into an electrical signal. The electrical signal then drives modulation driver 308 and/or AOM 314 to facilitate turning light source 310, according to the digital information on the file. EFM encoder 306 can be configured as any type of encoder known in the art, such as, for example, a Media Morphics™ encoder.

AOM 314 is configured to control the power, frequency and/or spatial direction of light source 310 using the electrical drive signal from modulation driver 308. DAC/frequency controller 312 is used to convert the binary code of digital images 302 to an analog signal, such as, for example, frequency, voltage, and/or electrical current to drive modulation driver 308.

Light source 310 is configured as any type of light source for facilitating writing data and/or images to a storage device. Light source 310 can include gas lasers, LEDs, dye lasers, and/or any other type of light source and/or laser. In one embodiment, system 300 incorporates a Coherent Enterprise II laser at 413 nm as light source 310 and has an acousto-optical modulator to turn light source 310 on and off in the nanoseconds range. Light source 310 can be coupled to one or more additional optical elements to facilitate focusing and/or recording. For example, in one embodiment, light source 310 is focused by an objective lens to a spot size of about 0.3 microns.

Media source 324 comprises any type of data source for writing non-image data to photosensitive substrate 320. Media source 324 can include a computer, a network, a flash drive, a data file, a music file, a movie file, and/or any other data media, network and/or device.

Turn-table apparatus 322, in one embodiment, is configured as a rotary turntable that provides a rotational pulse, for example, per each rotation. Turn-table apparatus 322 can also comprise a translation system 326 that moves light source 310 radially relative to the turn-table apparatus 322. Translation system 326 comprises one or more lenses, reflectors, beam-splitters, and/or the like. Turn-table apparatus 322 may be configured similarly to turn tables used in the making of prerecorded or recordable glass masters for CD and DVD's. For example, turn-table apparatus 322 can comprise systems that are commercially available through companies such as Sony, Panasonic, Singulus, M2, ODC, and/or the like. In one exemplary embodiment, turn-table apparatus 322 is the Singulus AM200 system.

Photosensitive substrate 320 can comprise any type of substrate, such as a substrate formed of glass, quartz and/or a ceramic material, which can be configured to be coated with a photosensitive substance. Examples of photosensitive substances include photodyes, phase-change alloys and/or photoresists. One of reasonable skill in the art will recognize that numerous photosensitive substances and substrates are contemplated in this disclosure.

In exemplary embodiments, the photosensitive substrate 320 can be configured to be any size and/or shape. In one exemplary embodiment, photosensitive substrate 320 is configured in a round format with a 160 mm diameter. In one embodiment, the photosensitive substrate 320 is created by coating a substrate with a photosensitive substance at 200 nm deep so that the photosensitive substrate 320 is sensitive to a 413 nm recording wavelength. The photosensitive substance layer can be formed by coating a photoresist material over a surface of a substrate. The photoresist material can be configured to be "activated" by having a photochemical reaction upon exposure. A variation of depth of the photoresist layer on photosensitive substrate 320 can facilitate increasing the contrast of images 302 depending on the viewing source of light. In one exemplary embodiment, the photosensitive substance used to coat the substrate is a 20% concentration of photoresist and solvent manufactured by Shipley.

Figure 6:
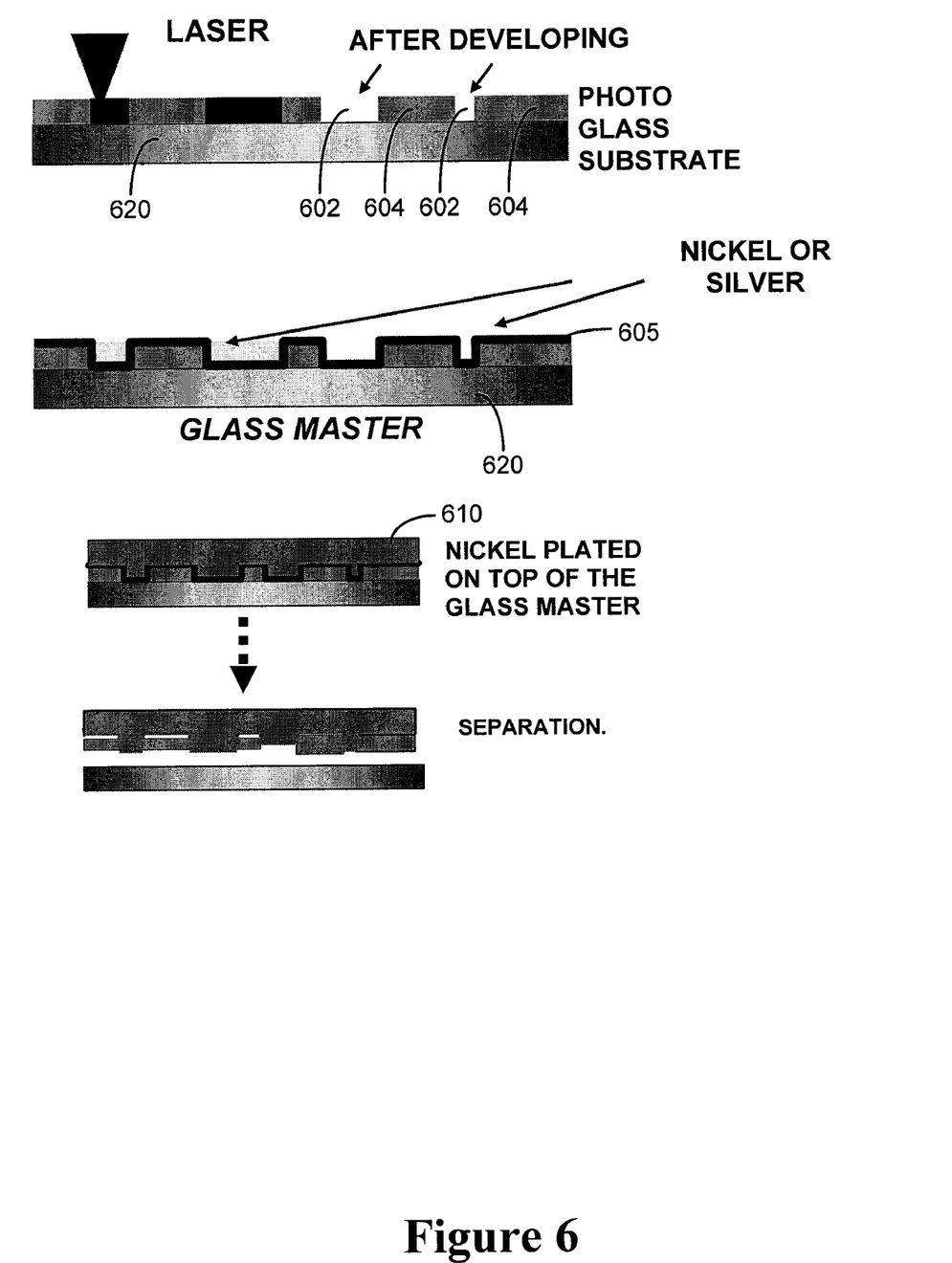
FIG. 6 illustrates a method of creating reproducible masks with a plurality of pseudo-holographic images to assist in copying, in accordance with exemplary embodiments of the present invention.

In certain embodiments, to optimize the first order intensity of image 302 patterns, photosensitive substrate 604 (i.e. the recording layer) can be configured to have a thickness that is not optimal to facilitate creation of features that are useful in the playback of the optical data storage media. In these embodiments, the thickness of the recording layer 604 can be configured with a thickness that is higher than optimal for the recording of the optical data storage media. During the recording process, the relative intensity difference of light source 310 can be made such that the intensity of light source 310 for the optical data storage media when developed will result in features that facilitate the playback of such media.

Figure 4:
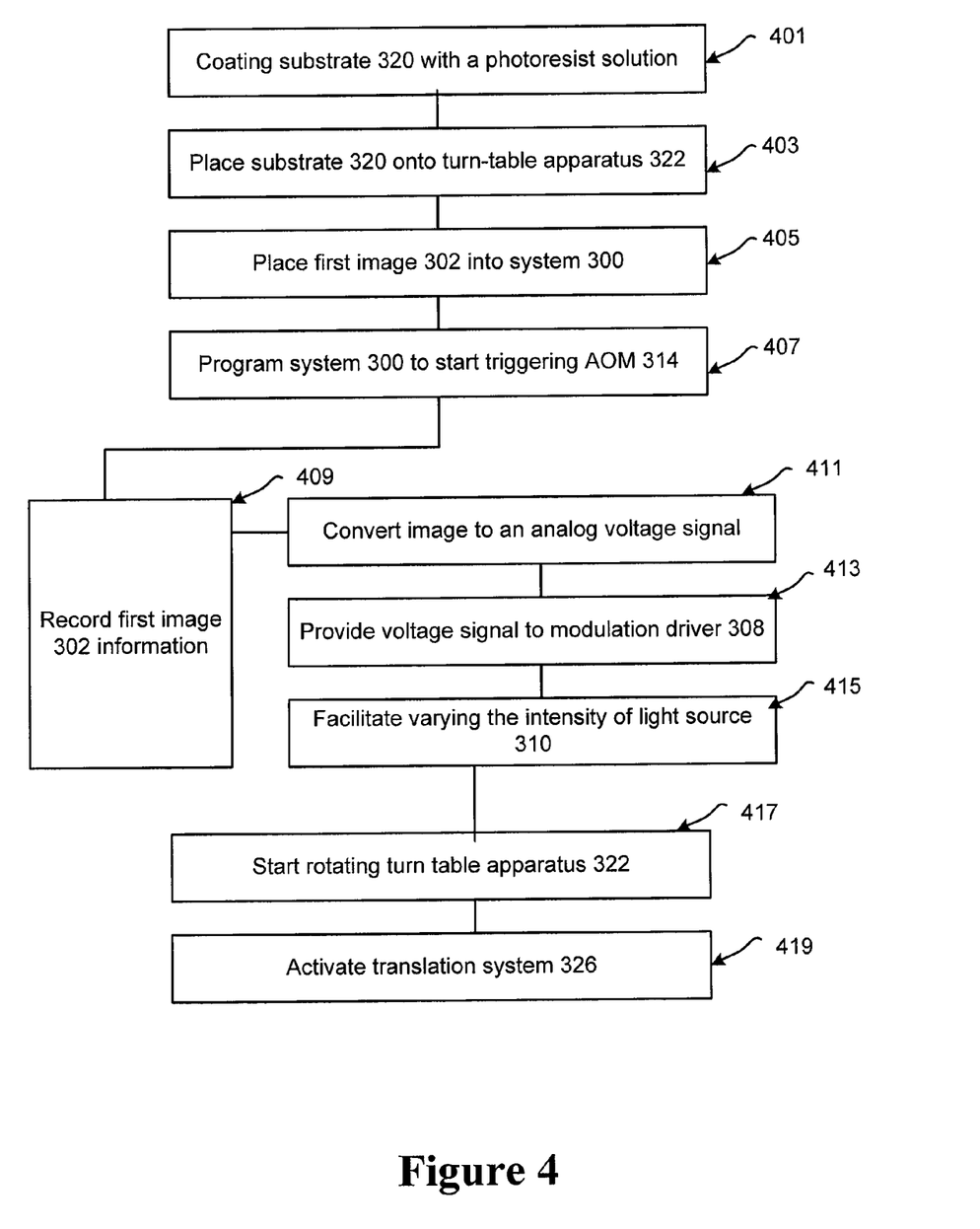
FIG. 4 illustrates a flow diagram of the method of creating a first pseudo-holographic image in accordance with exemplary embodiments of the present invention.

An exemplary method for using recording system 300 to facilitate recording images 302 on the same plane using diffractive elements is illustrated with reference to an exemplary flow chart illustrated in FIGS. 4 and 5. An exemplary method for recording a first image 302 comprises coating a substrate with a photosensitive substance solution (step 401). For example, a substrate can be covered with a solution of 20% photoresist to achieve a photoresist thickness of 200 nm. Once substrate has been covered with a desired layer of photoresist material 604, it can be placed onto turn-table apparatus 322 of system 300 (step 403).

First image 302 can be placed into system 300 to begin the recording process (step 405). Computer controller 304 may be used to program system 300 to start triggering AOM 314 with the information from the first image 302 (step 407). The programming information may comprise of start and stop dimensions for recording image 302 onto photosensitive substrate 320. For example, computer controller 304 may be configured to record first image 302 information starting at a 35 mm radius on photosensitive substrate 320 and ending at a 50 mm radius on photosensitive substrate 320 (step 409).

During recording, the color information from first image 302, representing each pixel, can be converted to an analog voltage using a DAC 312 (step 411) and the voltage from DAC 312 can be provided to modulation driver 308 and/or AOM 314 (step 413) to facilitate varying the intensity of light source 310 in increments of the max laser intensity divided by 2 to the power of the number of bits representing the color information (step 415). The color information can also be converted to frequency information where the voltage used to drive modulation driver 308 and/or AOM 314 is a wave voltage signal with the frequencies varying in increments of reference frequency divided by 2 to the power of the number of bits representing the color information.

During the recording steps (steps 409-415), computer controller 304 may also be configured to start rotating turn table apparatus 322 at a constant angular velocity (step 417), for example, at a constant angular velocity of 10 revolutions per second. Computer controller 304 can also be used to activate translation system 326 to displace light source 310 radially to create a spiral exposure pattern matching the pixels of first image 302 (step 419). That is, translation system 326 can be configured to traverse at a constant rate, for example, at a rate of 1 micron per revolution.

After the first image 302 has been recorded, a second image 302 can be recorded onto photosensitive substrate 320. Photosensitive substrate 320 can be configured to remain in the same position as it was for the recording of the first image 302, and translation system 326 can be reset back to the same starting radius that it was in for recording first image 302 (step 501). A second image 302 can be configured to be recorded by system 300 (step 503). After second image 302 is in place, computer controller 304 can be again programmed to start triggering AOM 314 with the information from second image 302 (step 505). For example, computer controller 304 may be configured to record second image 302 information starting at a 35 mm radius on photosensitive substrate 320 and ending at a 50 mm radius on photosensitive substrate 320 (step 507).

During recording, the color information from second image 302, representing each pixel, can be converted to an analog voltage using a DAC 312 (step 509) and the voltage from DAC 312 can be provided to modulation driver 308 and/or AOM 314 (step 511) to facilitate varying the intensity of light source 310 in increments of half the max laser intensity divided by 2 to the power of the number of bits in image 302 (step 513). The color information can also be converted to frequency information where the voltage used to drive modulation driver 308 and/or AOM 314 is a wave voltage signal with the frequencies varying in increments of reference frequency divided by 2 to the power of the number of bits in image 302.

During these second recording steps (step 507-513), computer controller 304 may also be configured to start rotating turn table apparatus 322 at a constant angular velocity (step 515), for example, at a constant angular velocity of 10 revolutions per second. Computer controller 304 can also be used to activate translation system 326 to displace light source 310 radially to create a spiral exposure pattern matching the pixels of second image 302 (step 517). That is, translation system 326 can be configured to traverse at a constant rate, for example, at a rate of 1.5 micron per revolution.

Figure 5:
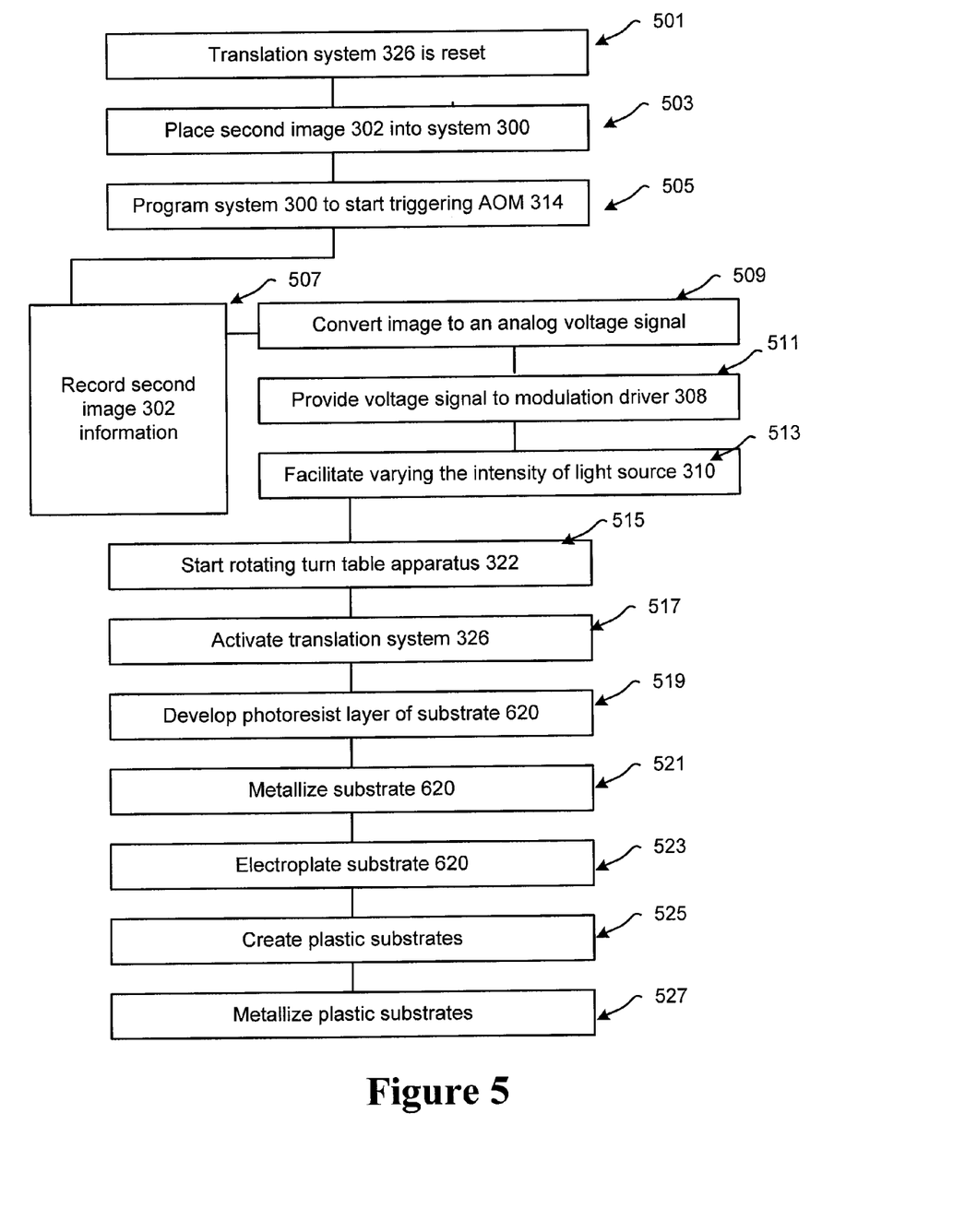
FIG. 5 illustrates a flow diagram of the method of creating a second pseudo-holographic image, in accordance with exemplary embodiments of the present invention.

With reference to an exemplary diagram illustrated in FIG. 6, and with continued reference to FIG. 5, the photosensitive substance layer of photosensitive substrate comprising a photoresist 620 can then be developed to provide the two separate spacings from recording images 302 (step 519). That is, upon developing the photoresist layer, regions corresponding to grooves 604 and/or depressions 602 are exposed. By "developing" the photoresist layer, it can be immersed in, sprayed with, exposed to and/or combined in any other way with a developer.

Photosensitive substrate 620 can then be metallized (step 521), using any metallization process, such as, for example, a sputtering process. By metallization, a metal 605, such as, for example nickel or silver, can be evaporated and/or coated onto the surface of exposed photosensitive substrate 620, providing a conductive layer. Once photosensitive substrate 320 is metallized, it can be electroplated to transfer the autostereoscopic images to a nickel master and/or stamper (step 523). That is a stamper 610 can then formed by plating a metal, for example nickel, against and into depressions 602 and/or grooves 604 to provide stamper 610 having inverted features, i.e. raised features on one surface.

Stamper 610 can then be placed in a molding machine to create plastic substrates (step 525). By creating plastic substrates, stamper 610 can be used to facilitate replicating grooves 604 and/or depressions 602 into a plastic substrate (not shown) by embossing techniques and/or by injection molding procedures. Plastic substrates can be made out of any plastic and/or glass material, including, for example, a polycarbonate material. Plastic substrate can be metallized by being overcoated with a recording medium structure (step 527), which can include a recording layer containing a dye, a reflective metallization layer over the recording layer, and/or a protective layer formed over the metallization layer.

Figure 7:
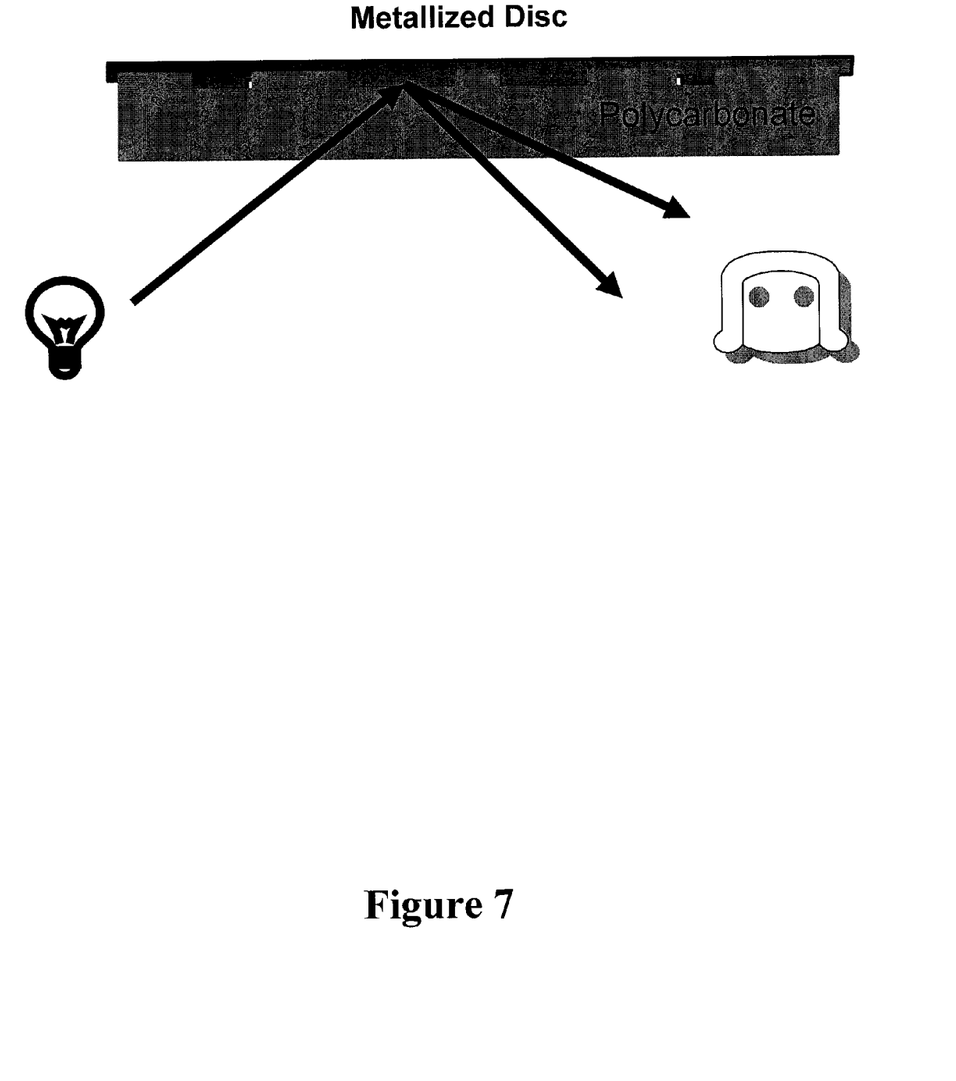
FIG. 7 illustrates a surface with a plurality of pseudo-holographic images viewable under different selected angles, in accordance with exemplary embodiments of the present invention.
Figure 8:
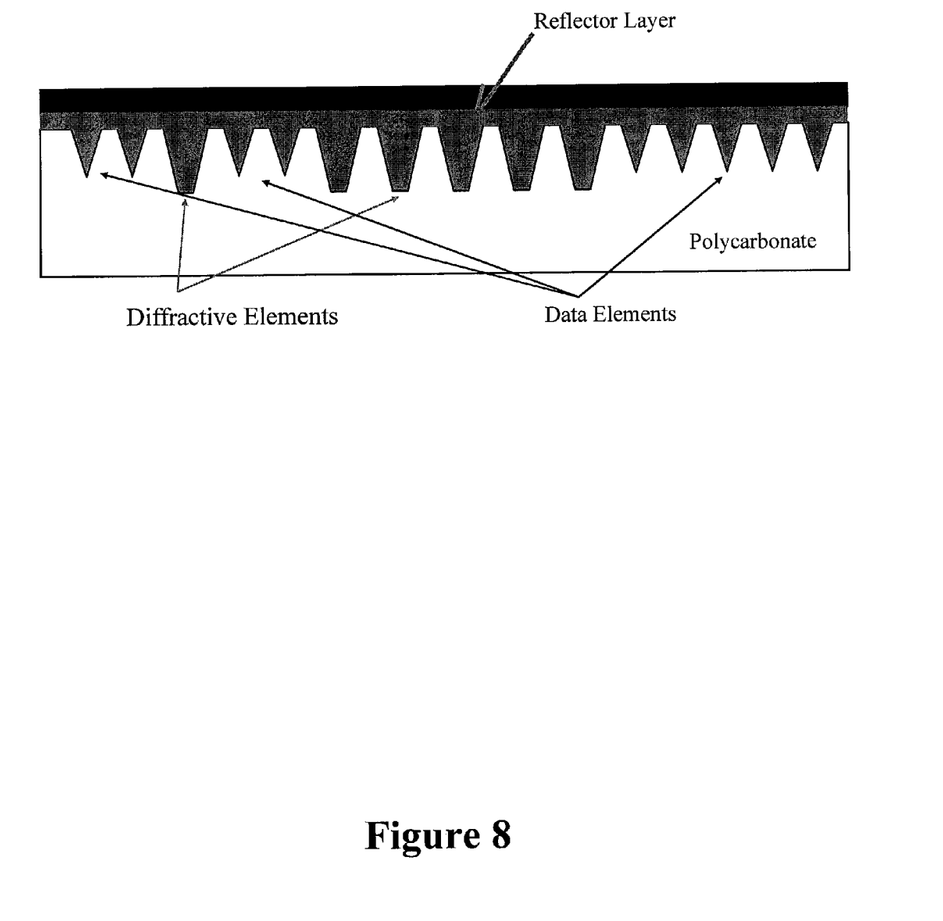
FIG. 8 illustrates a novel, optical storage device with superimposed pseudo-holographic images, in accordance with exemplary embodiments of the present invention.

When the metallized plastic substrates are viewed under a source of light, first and second images 302 are revealed at the angles designed. Specifically first image 302 will be seen (or partially seen) at one angle without completely or partially seeing second image 302. When moved to the anticipated angle of second image 302, only second image 302 can be viewed (or partially viewed) without completely or partially seeing first image 302. In exemplary diagram in FIG. 7, an example of how the angle of viewing affects the viewing of images 302 is provided.

In another embodiment, diffraction patterns create superimposed other information (e.g., barcode) viewable under different selected angles on the photosensitive substrate, which can be read by either a human and/or a computer.

In another exemplary embodiment, the optical storage device is exposed with a plurality of diffractive elements, such that, when the storage device is tilted from the reading hardware or the reading hardware is moved to varying angles above the storage device data can be retrieve at each discrete angle. This embodiment allows for increased data density on many common optical storage devices such as, for example CDs, DVD's, BluRay disc, HDDVD, Recordable Optical Discs, Pre-Recorded Optical Discs and/or optical memory cards.

In another exemplary embodiment, in the DVD format as defined in the ECMA-267 standard, the two different planes that carry optical information are separated by a gap to allow for playback of more data. Thus, the diffractive elements of the current invention can be used to cause multiple diffractions on the DVD, and the most predominant of the diffraction orders can be placed to display multiple images through the same side of the DVD. That is, a first layer may be configured to be the data layer where light is partially reflected, and a second layer can contain the diffractive elements and/or images where the reflectivity is manufactured to be higher than that of the first layer. Additionally and/or alternatively, a layer of diffractive elements can be inserted without interference into the functioning playback layer of the intended optical data surface. Thus, if a playback device is tilted away from perpendicular and read by reflected signal, more data can be read back from the optical data surface at multiple angles. As a result, more data can be provided from both sides of an optical data surface.

In another embodiment, the diffractive elements can be placed on non-optical carrying data regions as well as in the optical data carrying regions as well. The present invention contemplates the diffractive elements being formed on any surface. In one embodiment, the diffractive elements are formed on the side surfaces of the pits. For example, the most predominant order of the images can be placed at distinct angles outside that of the optical storage media, so that they can be exposed on the data area of optical storage media without interfering with the playback of the optical storage media. This may be useful for security and/or other purposes.

In yet another exemplary embodiment, to improve the discrimination of the multiple images, each image can be recorded into a recording layer that is thicker than the optimal recording thickness needed to create data elements usable in the playback of optical storage media. That is, the typical image thicknesses range from 120 nm to 250 nm, however, the images can be configured to be recorded at thicknesses in excess of 250 nm. In order to facilitate this process, the diffractive elements are used to expose the predominant orders at a higher laser intensity. This, in turn, causes the photoresist to be exposed at a greater depth than normal, while the laser intensity used to create the data elements can be exposed at a lower intensity. As a result, the exposed depth of the photoresist is developed at an optimal depth for use in facilitating playback of the data elements.

Figure 9:
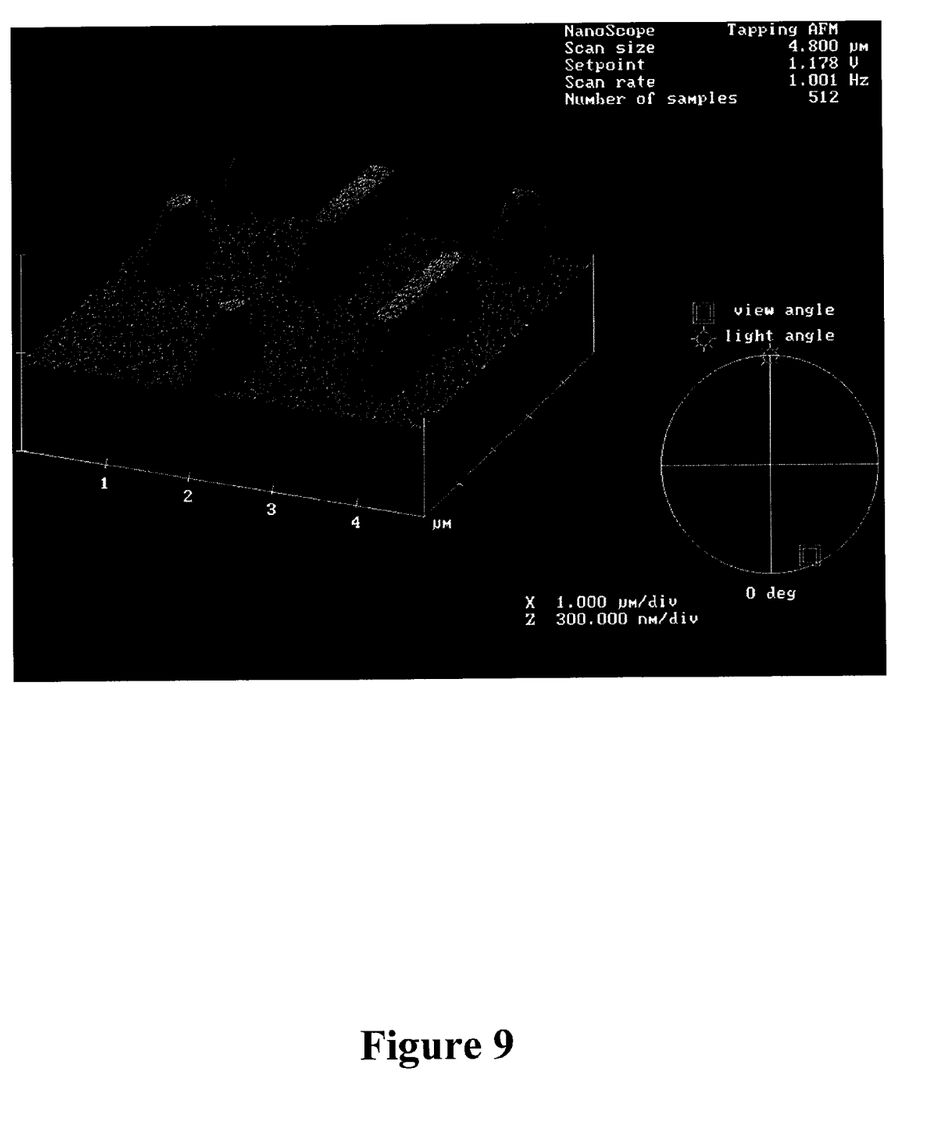
FIG. 9 illustrates an Atomic Force Microscope (AFM) image of the diffractive elements, in accordance with exemplary embodiments of the present invention.

An exemplary illustration of the diffraction elements can be found in FIG. 9. FIG. 9 represents an AFM image of the diffractive elements of this invention. As illustrated, the diffractive elements, in one embodiment, are substantially non-uniform, discrete diffractive elements. These elements are pre-calculated and digitally recorded individually. In an exemplary embodiment, each of the plurality of diffractive elements is formed by only one exposure to only one light wave. This individual digital recording uses single beam hardware, which is commonly sold for creating the indentations on optical storage devices and can create the diffractive elements much more quickly. Additionally, these elements produce holograms using phase interference and are analog in nature.

For the sake of brevity, conventional data networking, application development and other functional aspects of the systems (and components of the individual operating components of the systems) may not be described in detail herein. It also should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MYSQL, Interbase, etc., may be used to provide an Active Data Object (ADO) compliant database management system.

Because data may be written from any media source, a website and/or web page may be used as a source of images and/or other data to be recorded. Further, any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The present invention may be described herein in terms of functional components, optional selections and various processing steps. It should be appreciated that such functional components may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

The detailed description of exemplary embodiments of the invention herein shows various exemplary embodiments and the best modes, known to the inventors at this time, of the invention are disclosed. These exemplary embodiment and modes are described in sufficient detail to enable those skilled in the art to practice the invention and are not intended to limit the scope, applicability, or configuration or the invention in any way. Rather, the following disclosure is intended to teach both the implementation of the exemplary embodiments and modes and any equivalent modes or embodiments that are known or obvious to those of reasonably skill in the art. Additionally, all included figures are non-limiting illustrations of the exemplary embodiments and modes, which similarly avail themselves to any equivalent modes or embodiments that are known or obvious to those of reasonably skill in the art.

As used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but may also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, may be varied or otherwise particularly adapted to specific environments, manufacturing specifications, design parameters or other operating requirements without departing from the scope of the instant invention and are intended to be included in this disclosure.

Moreover, unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If it is intended to limit or narrow these meanings specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

The use of the words "function", "means" or step in the specification or claims is not intended to invoke the provisions of 35 USC 112, Paragraph 6, to define the invention. To the contrary, if such provisions are intended to be invoked to define the invention, then the claims will specifically state the phrases "means for" or "step for" and a function, without recitation of such phrases of any material, structure, or at in support of the function. Contrastingly, the intention is NOT to invoke such provision when then claims cite a "means for" or a "step for" performing a function with recitation of any structure, material, or act in support of the function. If such provision is invoked to define the invention it is intended that the invention not be limited only to the specific structure, materials, or acts that are described in the preferred embodiments, but in addition to include any and all structures, materials, or acts that perform the claimed function, along with any and all known or later-developed equivalent materials, structures, or acts for performing the claimed function.

What is claimed is:

1. A method for forming images on a photosensitive substrate, the method comprising:
  exposing, solely by a single laser beam wavefront lacking interference information, a rotating photosensitive substrate a first time to form a plurality of first diffractive elements, wherein the plurality of first diffractive elements are spaced at a first distance per revolution, wherein the exposing is accomplished without the use of a beamsplitter or a reference beam, and wherein the exposing is accomplished with one laser beam impact point;
  forming a first diffraction image comprising the plurality of first diffractive elements, wherein the first diffraction image can be viewed at a first angle;
  exposing, solely by the single laser beam wavefront lacking interference information, the rotating photosensitive substrate a second time to form a plurality of second diffractive elements, wherein the plurality of second diffractive elements are spaced at a second distance per revolution; and
  forming a second diffraction image comprising the plurality of second diffractive elements, wherein the second diffraction image can be viewed at a second angle different from the first angle.

2. The method of claim 1, wherein a diffractive element of the plurality of first diffractive elements is non-uniform with respect to other first diffractive elements.

3. The method of claim 2, wherein each of the first plurality of diffractive elements is formed by only one exposure to only one light wave.

4. The method of claim 3, wherein the exposing is accomplished without the use of more than one laser beam.

5. The method of claim 4, wherein the first diffraction image is exposed to form at least one of a different depth or a different optical profile from the second diffraction image.

6. The method of claim 5, wherein the plurality of first diffractive elements are exposed at a first range of depths, wherein the plurality of second diffractive elements are exposed at a second range of depths, and wherein the first range of depths is different than the second range of depths.

7. The method of claim 6, wherein the second range of depths includes a depth of about 200 nm.

8. The method of claim 2, wherein the non-uniformity is directed by information in a data file comprising a digital image, and wherein the plurality of diffractive elements produce a holographic effect using phase interference.

9. The method of claim 8, wherein the second set of diffractive elements is exposed to be superimposed on top of the first set of diffractive elements to create multiple holographic effects.

10. The method of claim 8, wherein the data file contains recording information for both the first diffractive image and the second diffractive image.

11. The method of claim 1, wherein the plurality of first diffractive elements are non-uniform.

12. The method of claim 11, wherein the plurality of second diffractive elements are non-uniform.

13. The method of claim 1, wherein the exposing is performed by a laser beam which is not split between the laser beam source and the photosensitive substrate.

14. The method of claim 13, wherein the exposing is performed by an unsplit laser beam.

15. The method of claim 14, wherein the one laser beam impact point comprises a size of about 0.3 microns.

16. The method of claim 15, wherein the one laser beam impact point exposes one of the plurality of first diffractive elements at a time.

17. The method of claim 16, wherein each of the plurality of first diffractive elements is pre-calculated individually and digitally recorded individually.

18. The method of claim 17, wherein the exposing is performed utilizing single-beam hardware.

19. The method of claim 18, wherein the exposing is performed by turning a laser on and off in the nanoseconds range.

20. The method of claim 19, wherein the plurality of first diffractive elements are exposed one diffractive element at a time.

21. The method of claim 20, wherein each one of the plurality of first diffractive elements corresponds to only one pixel of a digital image, and wherein the plurality of first diffractive elements collectively comprise a representation of the digital image.

22. The method of claim 21, wherein the exposing the first time further comprises varying, responsive to information for each pixel in the digital image, the intensity of the laser.

23. The method of claim 22, wherein the information is color information.

24. The method of claim 1, wherein, between the laser source and the photosensitive substrate, the laser beam does not contact an element intended to introduce interference information to the laser beam to be recorded by the laser beam.

25. An apparatus with multiple diffraction images, the apparatus comprising:
a substrate;
a plurality of first diffractive elements coupled to the substrate, wherein the first diffractive elements are formed by exposing a rotating photosensitive substance on the substrate solely to a laser beam wavefront lacking interference information, wherein the exposing is accomplished without the use of a beamsplitter or a reference beam, wherein the exposing is accomplished with one laser beam impact point, and wherein the laser beam is configured to traverse the substrate at a first distance per revolution; and
a plurality of second diffractive elements coupled to the substrate, wherein the second diffractive elements are formed by exposing a rotating photosensitive substance on the substrate solely to the laser beam wavefront lacking interference information, wherein the exposing is accomplished without the use of a beamsplitter or a reference beam, wherein the exposing is accomplished with one laser beam impact point, wherein the laser beam is configured to traverse the substrate at a second distance per revolution different from the first distance, and wherein the first diffractive elements form a first diffraction image viewable at a first angle, and the second diffractive elements form a second diffraction image viewable at a second angle different from the first angle.

26. The apparatus of claim 25, wherein the first diffraction image and the second diffraction image are viewable at distinct depths and at distinct angles.

27. A method for forming image labels, the method comprising:
modulating, responsive to information associated with pixels of a digital image, the intensity of a laser beam wavefront, the laser beam wavefront lacking interference information;
exposing a rotating photosensitive substrate solely with the laser beam a first time to sequentially form a plurality of first diffractive elements on a surface of the photosensitive substrate, wherein the exposing is accomplished without the use of a beamsplitter or a reference beam, wherein the exposing is accomplished with one laser beam impact point, and wherein the laser beam is configured to traverse the substrate at a first distance per revolution;
exposing the rotating photosensitive substrate solely with the laser beam a second time to sequentially form a plurality of second diffractive elements on the surface of the photosensitive substrate, wherein the exposing is accomplished without the use of a beamsplitter or a reference beam, wherein the exposing is accomplished with one laser beam impact point, and wherein the laser beam is configured to traverse the substrate at a second distance per revolution different from the first distance;
forming a first diffraction image comprising the first diffractive elements, which can be viewed at a first angle;
forming a second diffraction image comprising the second diffractive elements, which can be viewed at a second angle; and
removing at least a portion of the substrate to form a label comprising at least a portion of the first diffractive elements and the second diffractive elements.

28. A method for forming a digital image on a photosensitive substrate, the method comprising:

calculating a configuration for a plurality of diffractive elements, the plurality of diffractive elements configured to create a diffraction image corresponding to the digital image;

focusing, via an objective lens, a single laser beam wavefront lacking interference information onto one laser beam impact point on a rotating photosensitive substrate;

varying, responsive to recording information in the digital image, the intensity of the single laser beam wavefront in the nanoseconds range; and exposing, solely by the single laser beam wavefront, the rotating photosensitive substrate to form the plurality of diffractive elements, wherein at least one of the plurality of diffractive elements is non-uniform in depth, width, and height with respect to the other diffractive elements, wherein the exposing is accomplished without the use of a beamsplitter or a reference beam, wherein the single laser beam wavefront exposes one of the plurality of first diffractive elements at a time, wherein each one of the plurality of diffractive elements corresponds to one pixel of the digital image, and wherein, during the exposing, the single laser beam wavefront is translated radially with respect to the rotating photosensitive substrate.

29. The method of claim 28, wherein the plurality of diffractive elements form a spiral pattern.

30. The method of claim 28, wherein the non-uniformity is directed by information in a data file comprising the digital image, and wherein the plurality of diffractive elements produce a holographic effect using phase interference.

31. The method of claim 28, further comprising exposing, solely by the single laser beam wavefront, the rotating photosensitive substrate to form a second plurality of diffractive elements, the second plurality of diffractive elements superimposed on top of the plurality of diffractive elements to create multiple holographic effects.

32. The method of claim 30, wherein the single laser beam wavefront is not split between the laser beam source and the photosensitive substrate, wherein the intensity of the single laser beam wavefront is varied in increments of the maximum single laser beam intensity divided by 2 to the power of the number of bits representing the color information, wherein the one laser beam impact point comprises a size of about 0.3 microns, wherein each of the plurality of first diffractive elements is pre-calculated individually and digitally recorded individually, and wherein the single laser beam wavefront does not contain interference information intended for recordation in the photosensitive substrate.

* * * * *